No. 738,165. PATENTED SEPT. 8, 1903.
A. J. DE LA CROIX.
AIR BRAKE.
APPLICATION FILED APR. 23, 1903.
NO MODEL.
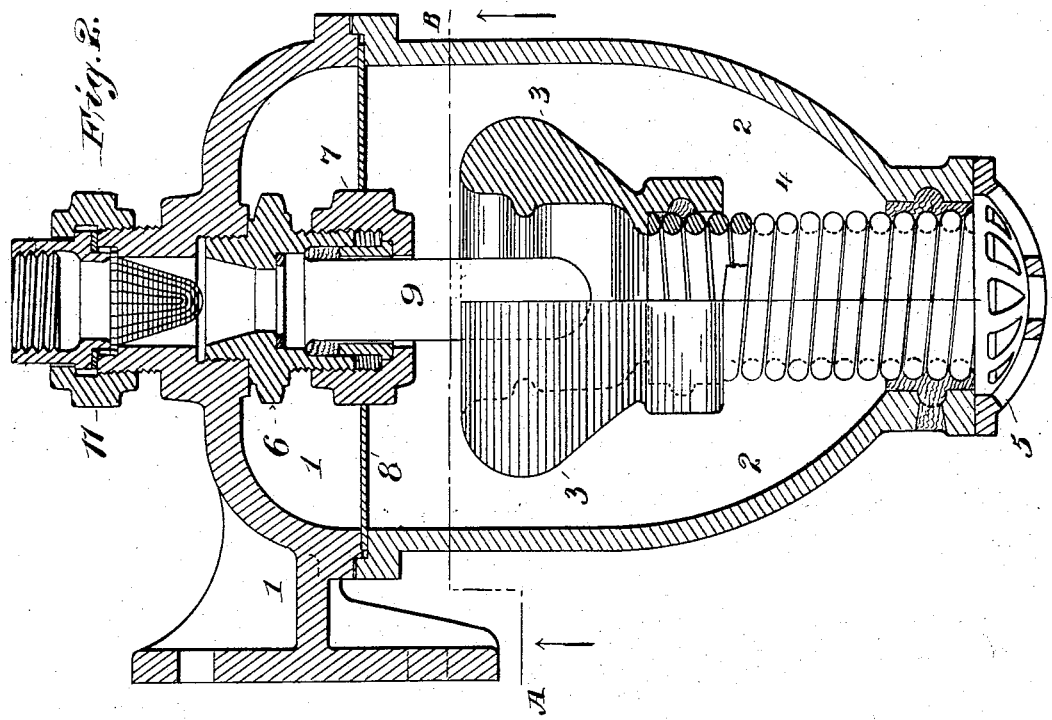
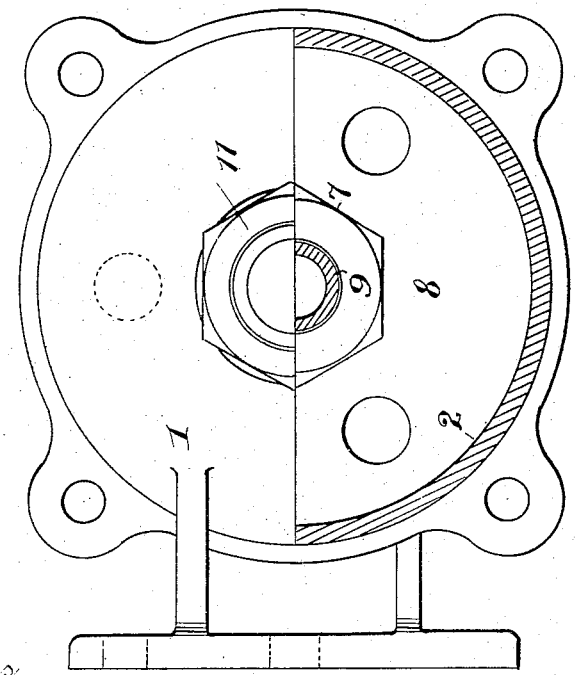
Witnesses
Inventor
Arthur Jallan de la Croix
By his Attorney No. 738,165. Patented September 8, 1903.

UNITED STATES PATENT OFFICE.

ARTHUR JALLAN DE LA CROIX, OF ST. PETERSBURG, RUSSIA.

AIR-BRAKE.

SPECIFICATION forming part of Letters Patent No. 738,165, dated September 8, 1903.

Application filed April 23, 1903. Serial No. 153,979. (No model.)

*To all whom it may concern:*

Be it known that I, ARTHUR JALLAN DE LA CROIX, a subject of the Emperor of Russia, residing at St. Petersburg, Russia, (whose post-office address is Nevski 11 Westinghouse's offices, St. Petersburg, Russia,) have invented certain new and useful Improvements in Air-Brakes, of which the following is a specification.

My apparatus is designed to be employed in connection with automatic air-brakes of any system fitted to railway rolling-stock; and its object is to automatically operate the brakes in cases where the trucks of the rolling-stock are wrecked or the train has left the rails.

In the accompanying drawings, Figure 1 is an end view, half in section, on the line A B of Fig. 2 of an apparatus embodying my invention. Fig. 2 is a longitudinal section of the same on a diametrical plane.

The construction of the apparatus is as follows:

In the cast-iron part 1 by means of a stuffing-box formed by the nuts 6 and 7 is secured a glass tube 9, open at one end, its open end being directed toward the part 1 and its closed end projecting from the nut 7. On the part 1 by means of flanges and bolts is fastened a part 2, in which is immovably fixed a spiral spring 4 by one end, while on the other end is fastened a cast-iron weight 3 of the peculiar form shown in the drawings, with an internal annular projection embracing concentrically the end of the aforesaid glass tube 9. The fastening of the spring in the part 2 and in the weight 3 may be most conveniently effected by means of pouring over it some easily-fusible composition, care being taken that in the horizontal position of the part 2 the center of the said annular projection of the weight 3 should coincide exactly with the axis of the part 2.

Between the parts 1 and 2 when the apparatus is being assembled is inserted a round disk 8, of sheet-iron, with an aperture in the center corresponding to the contour of the nut 7. This disk tightly embracing the nut 7 in any position it may assume and being itself clamped between the flanges of the parts 1 and 2 does not permit of the nut 7 unscrewing from the shocks accompanying the movement of the rolling-stock.

The free end of the part 2 is closed with a latticed cover 5, preventing foreign bodies from getting into the apparatus.

Parts 1 and 2, serving to secure and adjust in them the internal parts of the apparatus, at the same time completely close and protect them from accidental damage and atmospheric influences. The apparatus by means of the horizontal flange situated on the part 1 is fitted on the rolling-stock on any place convenient for the purpose in such a manner that the axis of the apparatus should be horizontal and parallel to the longitudinal axis of the rolling-stock. On connecting then the apparatus with the common piping of the air-brake by means of the nut 11 and the connecting-tube, there being inserted at the place of junction a net 10 to prevent the piping from becoming blocked with fragments of the tube in case of the latter getting broken, the apparatus is ready for action.

The action of the apparatus is as follows: In the case of ordinary vertical and lateral shocks and concussions experienced by the rolling-stock during its movement in consequence of the unevenness of the track the weight 3, rocking on the spring 4, does not reach with its annular projection to the glass tube 9, and the latter remains whole. In like manner in the case of longitudinal shocks of any violence—for example, during maneuvering during coupling or starting of the train—the weight 3 by extending or compressing the spring 4 travels parallel to the axis of the tube 9, and the latter remains untouched. In the case, however, of any vertical or lateral shocks exceeding in their violence a definite limit determined by the elasticity of the spring 4—for example, in the case of shocks caused by the fracture of the axles, wheels, or springs or the derailment of the rolling-stock—the weight 3 by means of its annular projection strikes against the glass tube 9 and the latter breaks, thus giving free issue to the air from the common piping of the brake if the latter is operated by compressed air or, on the contrary, admitting air from the external atmosphere to the piping of the brake if the latter is operated by rarefied air. Thus the brake independently of its system is brought into action at the very instant of the first abnormal shock experienced by the rolling-stock, and by this very fact the wrecking or derailment of the train is prevented, or at any rate the dimensions assumed by such wrecking or derailment are considerably diminished.

The principal peculiarities of the apparatus invented by me as compared with other apparatus having the same object consist in the above-specified perfectly original construction of the chief parts of the apparatus—i. e., the weight of special form mounted on the end of the spiral spring and embracing concentrically the end of the glass tube connected with the common piping of the air-brake, as likewise in the peculiar action of these parts—founded on the fact that on the occurrence of the first abnormal shock experienced by the rolling-stock upon which the apparatus is fitted the glass tube breaks and the brace is brought automatically into action. Owing to this construction the apparatus presents a perfectly complete and compact part, and the action of the apparatus is thoroughly trustworthy and independent of the loading of the rolling-stock, the dimensions or construction of its trucks, and such like accidental conditions.

I claim as my invention—

1. An automatic apparatus for operating air-brakes, mounted on a car and consisting essentially of a glass tube, closed at one extremity and communicating with the common piping of the brake, and of a weight, surrounding this tube for a certain distance and carried by a spring, these parts being combined in such a manner that the first abnormal shock experienced by the car causes the fracture of the tube by the weight and opens the communication between the piping of the brake and the surrounding air, which causes the brake to act—substantially as described in the present specification and represented in the annexed drawings.

2. The combination with the train-pipe of an air-brake system, of a tube of fragile material in communication therewith, a weight adjacent to said tube, and a resilient support for said weight.

3. The combination with a railway-vehicle equipped with an air-brake, of a tube of fragile material arranged in communication with the train-pipe, and with its axis parallel with the longitudinal axis of the vehicle, a weight adjacent to said tube, and a resilient support for said weight permitting it to move both lengthwise and transversely of said tube.

In witness whereof I have hereunto set my hand in presence of two witnesses.

ARTHUR JALLAN DE LA CROIX.

Witnesses:
N. TSCHEKALOFF,
A. TSCHEKALOFF.